United States Patent
Evan et al.

(10) Patent No.: US 8,584,213 B2
(45) Date of Patent: Nov. 12, 2013

(54) AUTOMATED ENCRYPTION AND PASSWORD PROTECTION FOR DOWNLOADED DOCUMENTS

(75) Inventors: Michael J. Evan, Webster, NY (US); Jonathan D. Levine, Rochester, NY (US); Donald M. Pangrazio, III, LeRoy, NY (US)

(73) Assignee: Xerox Corporation, Norwalk, CT (US)

(*) Notice: Subject to any disclaimer, the term of this patent is extended or adjusted under 35 U.S.C. 154(b) by 332 days.

(21) Appl. No.: 12/893,081

(22) Filed: Sep. 29, 2010

(65) Prior Publication Data
US 2012/0079571 A1   Mar. 29, 2012

(51) Int. Cl.
*G06F 21/00* (2013.01)

(52) U.S. Cl.
USPC .................................. 726/5; 713/165; 726/18

(58) Field of Classification Search
USPC ............................................. 713/165; 726/5
See application file for complete search history.

(56) References Cited

U.S. PATENT DOCUMENTS

| | | | |
|---|---|---|---|
| 6,032,004 A | 2/2000 | Mirabella, Jr. et al. | |
| 6,061,448 A | 5/2000 | Smith et al. | |
| 6,185,651 B1 | 2/2001 | Monia et al. | |
| 6,314,425 B1 | 11/2001 | Serbinis et al. | |
| 6,343,361 B1 * | 1/2002 | Nendell et al. | 713/171 |
| 6,931,532 B1 | 8/2005 | Davis et al. | |
| 7,528,978 B2 | 5/2009 | Randt | |
| 7,639,807 B2 * | 12/2009 | Gava | 380/243 |
| 2002/0161667 A1 * | 10/2002 | Felkey et al. | 705/26 |
| 2002/0171859 A1 | 11/2002 | Chen et al. | |
| 2005/0066190 A1 * | 3/2005 | Martin | 713/200 |
| 2007/0061170 A1 * | 3/2007 | Lorsch | 705/3 |
| 2007/0076867 A1 | 4/2007 | Yeung et al. | |
| 2007/0211305 A1 | 9/2007 | Tanida | |
| 2008/0055627 A1 | 3/2008 | Ellis | |
| 2008/0148370 A1 * | 6/2008 | Allwright | 726/5 |
| 2009/0244595 A1 * | 10/2009 | Kim et al. | 358/1.15 |
| 2009/0293134 A1 * | 11/2009 | Oomura | 726/28 |
| 2010/0024011 A1 | 1/2010 | Fukuoka | |
| 2010/0097632 A1 | 4/2010 | Hattori | |
| 2010/0146600 A1 * | 6/2010 | Eldar et al. | 726/5 |
| 2010/0275272 A1 * | 10/2010 | Risan et al. | 726/30 |

FOREIGN PATENT DOCUMENTS

| | | | | |
|---|---|---|---|---|
| JP | 61114355 A | * | 6/1986 | |
| JP | 04373319 A | * | 12/1992 | |
| JP | 06035970 A | * | 2/1994 | |
| JP | 2003140875 | | 5/2003 | |
| JP | 2006243904 | | 9/2006 | |
| JP | 2006321144 | | 11/2006 | |
| JP | 2007164683 | | 6/2007 | |
| JP | 2008191810 A | * | 8/2008 | |
| JP | 2009301344 | | 12/2009 | |
| KR | 100654933 | | 11/2006 | |

* cited by examiner

*Primary Examiner* — Mohammad L Rahman
(74) *Attorney, Agent, or Firm* — Gibb & Riley, LLC

(57) ABSTRACT

A method receives a user login from a user. The method grants, to the user, access to a user account of the user maintained by a computerized document management system based on the user login. The computerized document management system is accessible to a plurality of users. The method receives a request from the user to provide a requested document and the method determines whether the requested document should be password protected. If the requested document should be password protected, the method generates a unique password for the requested document. The unique password is unique to the user and is based upon information contained within the user account by the computerized document management system. Again, if the requested document should be password protected, the method adds the unique password to the requested document to generate a password-protected document and sends the password-protected document to the first user.

16 Claims, 4 Drawing Sheets

AUTOMATED ENCRYPTION AND PASSWORD PROTECTION FOR DOWNLOADED DOCUMENTS

BACKGROUND

Embodiments herein generally relate to services that store and provide documents and other files, and more particularly, to a document service that provides a unique password specific to each user for secure files that are downloaded.

When a document is stored in a secure repository, only people or services with the appropriate access rights can read it or use it. But, if one of the authorized users downloads the document, it is often no longer secure. The embodiments described below address such situations to provide more security for the documents and to provide increased ease of use for the user by requiring them to know and learn less passwords.

SUMMARY

In view of such issues, one embodiment herein receives a user login from a user. The method grants, to the user, access to a user account of the user maintained by a computerized document management system based on the user login. The computerized document management system is accessible to a plurality of users. The method receives a request from the user to provide a requested document, and the method determines whether the requested document should be password protected. If the requested document should be password protected, the method generates a unique password for the requested document. The unique password is unique to the user and is based upon information contained within the user account by the computerized document management system. Again, if the requested document should be password protected, the method adds the unique password to the requested document to generate a password-protected document and sends the password-protected document to the first user.

Another, more specific, embodiment herein receives a first user login from a first user (potentially through a first computerized device operated by the first user) and a second user login from a second user (potentially through a second computerized device, which could be different than the first computerized device, that is operated by the second user) into the computerized document management system. The computerized document management system is again accessible to a plurality of users and comprises at least one computerized device.

The method grants, using the computerized document management system, to the first user (or, more technically, the first user's device) access to the first user's account maintained by the computerized document management system based on the first user login. The method similarly grants, again using the computerized document management system, to the second user (or, more technically, the second user's device) access to the second user's account maintained by the computerized document management system based on the second user login.

The computerized document management system receives a request from the first user and the second user to provide the same document (sometimes called a "requested document" herein). The computerized document management system then determines whether the requested document should be password protected. If the requested document does not need to be password protected, the computerized document management system sends the same requested document to the first user and the second user.

However, if the requested document should be password protected, the computerized document management system generates a first unique password and a second unique password for the requested document. The first unique password is unique to the first user, and is based upon information contained within the first user's account by the computerized document management system. The second unique password is unique to the second user, and is based upon information contained within the second user's account.

Also, if the requested document should be password protected, the computerized document management system adds the first unique password to the requested document to generate a first password-protected document, and adds the second unique password to the same requested document to generate a second password-protected document. Further, when the requested document is to be password protected, the computerized document management system sends the first password-protected document to the first user, and sends the second password-protected document to the second user.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
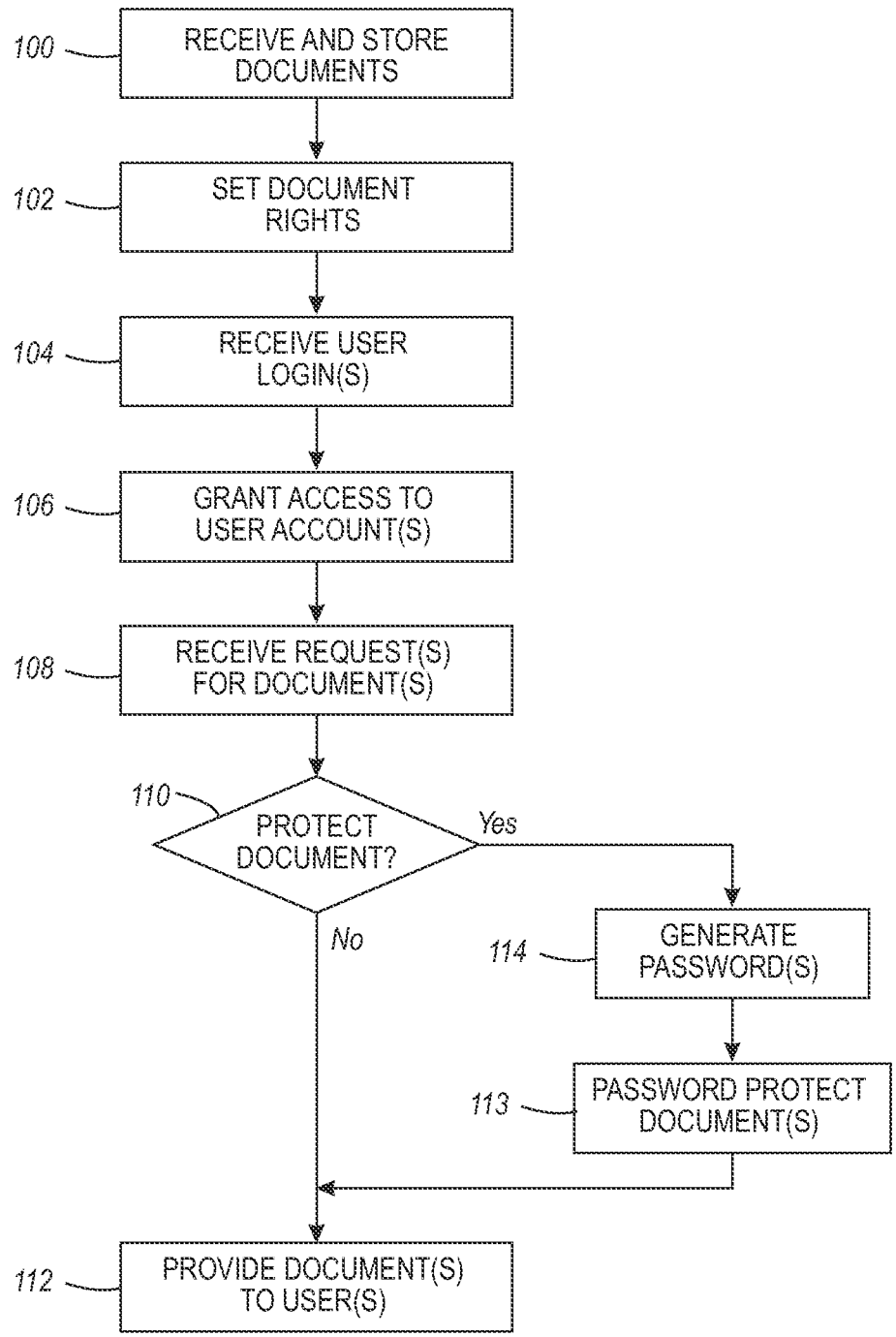
FIG. 1 is a flow diagram illustrating embodiments herein.

As mentioned above, if authorized users download a protected document, the document is often no longer secure after the download. The embodiments herein provide a service that increases the likelihood that the copy of a document that a user (or other service) has downloaded remains protected. The embodiments herein address a security gap in various workflows (including but not limited to print workflows) where a document that should be secure, is later copied or distributed in an unsecure state.

For example, the embodiments herein allow a user of a multifunction device (or the multifunction device itself) to download a document and ensure that the document will continue to be protected while the document is on the printer's hard drive. Thus, the embodiments herein provide that an electronic document automatically receives an access password and is encrypted, and this occurs when an authorized user downloads a document from a secure repository. A service running on the repository intercepts the document and adds password protection to the document and/or encrypts the document (depending on how the service is configured). Thus, with embodiments herein, a document is automatically locked and/or encrypted, and the password protection is triggered by the act of downloading the document from a repository.

With embodiments herein, an administrator loads and/or enables the encryption and locking service on the repository (the service may be installed automatically with the creation of the repository). Further, an administrator of the service can choose the following configuration options for each document and/or directory in the repository. The document (or documents) may be locked using, for example, the user's name and login password at the time that user downloads the document. In addition, the administrator can configure the service so that all documents that a particular user or set of users downloads will either be locked or encrypted or both. Further, the administrator can configure the type and level (strength) of encryption for at least the following methods (an administrator may add others): RC4 (if this is selected, the administrator will also select key lengths that begin at 40 and go up to between 56 and 128); RSA (public key encryption); International Data Encryption Algorithm (IDEA); etc. In addition, the administrator can configure the file to be wrapped in one of a number of lockable packages such as Zip or a proprietary locking mechanism (in case the digital file format does not accept locking, e.g. *.txt files).

The encryption and locking service according to embodiments herein is therefore configured to add, for example, a user's name and password to a digital document being downloaded from a directory. The encryption and locking service running on the repository tracks all document download requests. A user who has access to the repository downloads a document (note that the user might be a person but it also might be an automated service). The encryption and locking service intercepts the document. If the document is not locked and the embodiments herein are configured to lock the document, the service accesses the downloading user's security certificate (from the user's registration information on the repository) and writes the user's name and password into the document by creating a new security data structure and fills the fields of the data structure with the new security information (or updates an existing security data structure).

If the document is already locked and the service is configured to lock the document, the service accesses the downloading user's security certificate (from the user's registration information on the repository) and replaces the existing lock by updating the security information in the existing security data structure with, for example, the user's name and password information.

Similarly, if the document is not encrypted and the embodiments herein are configured to encrypt the document, the service encrypts the document using the specified encryption mechanism. Also, if the document is already encrypted using the same method specified by the service's configuration, no action is taken. However, if the document is already encrypted using a different method than the one specified, the embodiments herein decrypt the document and re-encrypt the document using the specified method.

After the encryption and locking service according to embodiments herein completes its operations, it sends the document on to the download destination. If the user or service that is downloading the document has administrative rights, then the user will be able to change the password and/or remove the encryption for the document (or locking package). If the user or service that is downloading the document does not have administrative rights, then the user will not be able to change the password or remove the encryption for the document (or locking package).

Thus, generally, the embodiments herein provide methods that receive a user login from a user. Again, the user can be a person, a computer, a printer, a service, etc. The method grants, to the user, access to a user's account maintained by a computerized document management system based on the user login. The computerized document management system is accessible to a plurality of users. The method receives a request from the user to provide a requested document and the method determines whether the requested document should be password protected. If the requested document should be password protected, the method generates a unique password (potentially based on the user's login name and password) for the requested document. The unique password is unique to the user and is based upon information contained within the user's account by the computerized document management system. Again, if the requested document should be password protected, the method adds the unique password to the requested document to generate a password-protected document and sends the password-protected document to the first user.

This embodiments herein automatically encrypt and/or lock a portable document format (PDF) or other digital document when an authorized user downloads the document from a secure repository. If the document is to be locked, it can inherit the downloader's user name and password. If the document is to be encrypted, the service encrypts it using a configured encryption method.

Various functional examples include where an administrator or service installs and runs the encryption and locking service on a repository service, or wherein an administrator configures the encryption and locking service to automatically lock and/or encrypt a document (or set of documents) when an authorized user downloads any of the documents in the set. Further, with embodiments herein, a user can register for access rights to a repository by providing a user name and password, and an administrator or a security service grants the registration request. The user is now known to the repository and is authorized to use the repository to gain access to the documents the user is permitted to use. Also, an electronic document may be stored in the repository, and an administrator or service may assign read and download access rights to a specific user (and perhaps others). The user may download the document to a local hard drive (e.g. a multifunction device); however, before the download begins, the encryption and locking service automatically and selectively assigns the user's name and password (which are known natively to the repository) to the document (so that only that user will be able to open the document) and encrypts it so that only that user can read it.

This process increases the security of downloaded documents by not assigning the same password to all users who download the document. The embodiments herein also simplify the process for each user because each user only needs to remember potentially one password to open all documents they download from the hosted document service (as opposed to having to remember a different password for each document they download). Further, by providing each copy of a document with a different password, the likelihood of the password for that document becoming widely known is lowered, because users are less likely to give out their personal passwords (potentially for their account or for all documents in their account) than they are to share a password for a single document.

As shown in flowchart form in FIG. 1, in one exemplary method herein a computerized document management system receives and stores documents that are to be stored (and potentially shared with others) in item 100. The documents can be received from a variety of sources, such as users, other networks, other services, or the documents can be obtained by searching and/or crawling other networks or systems.

Further, the creator of the document or another third party (such as an administrator) sets the document rights by marking the document as needing (or not needing) password or other similar document rights protection in item 102. The documents obtained in item 100 can have a standard default setting (such as not needing password protection) that can be selectively modified, or can have no default settings. Further, the document rights not only include password, locking encryption protection rights, but also include other rights such as printing restrictions, copying restrictions, forwarding restrictions, etc., that can be set in item 102.

Next, in item 104 this exemplary method receives at least one user login to the hosted service. For example, the system may receive a first user login from a first user (potentially from a first computerized device operated by the first user) and a second user login from a second user (potentially from a second computerized device, that can be different than the first computerized device, that is operated by the second user) into the computerized document management system. While the logins are shown in a single step in item 104, they may or may not be made simultaneously. The system embodiments herein are available as a download service to many users who may use the system at different times, and the description of two users herein is used merely as an example to illustrate that different users may access the same document, yet receive that same document protected with different passwords, where each password corresponds to a known password within each user's corresponding account.

By providing a valid login, each user is granted access to their individual account provided by the hosted service, in item 106. More specifically, the method grants, using the computerized document management system, to the first user (or, more technically, the first user's device) access to the first user's account maintained by the computerized document management system based on the first user login. In item 106, the method also grants, again using the computerized document management system, to the second user (or, more technically, the second user's device) access to the second user's account maintained by the computerized document management system based on the second user login. More specifically, in item 106, the computerized document management system determines whether the first user login is a valid first user login and whether the second user login is a valid second user login (by, for example, comparing stored passwords maintained by the hosted service with passwords input by users) before granting the first or second user access to their accounts.

While various users are logged into their respective accounts, the computerized document management system will periodically receive requests for one or more documents (item 108). For example, in item 108, the hosted service could receive a request from the first user and the second user for the same document (sometimes called a "requested document" herein) in item 108.

Upon receiving the document request(s) in item 108, the computerized document management system then determines whether the requested document should be password protected in item 110. More specifically, in item 110 the hosted service makes this password protection determination depending upon whether the document rights portion of the requested document has been marked as needing password protection by the creator or the third party (in item 100, above). The creator/third party that marks the password requirement of the document rights portion of the requested document in item 100 is different than the first user or the second user.

If the requested document does not need to be password protected, the computerized document management system sends the requested document to the first user and the second user without password protection in item 112. However, if the requested document should be password protected, the computerized document management system generates a first unique password and a second unique password for the requested document, as shown in item 114.

The first unique password is unique to the first user and is based upon information contained within the first user's account by the computerized document management system. Similarly, the second unique password is unique to the second user and is based upon information contained within the second user's account. For example, each user's main password (such as the password used to log into their account in item 104) can be used for the copy of the requested document that they will receive, or some other secondary password known to each respective user can be used. Thus, the user can establish one or many passwords within their account, and can have one password used to log into the account and one or more other passwords that will be used to password protect documents downloaded by the user.

This simplifies the process for each user because each user only needs to remember potentially one password to open all documents they download from the hosted document service (as opposed to having to remember a different password for each document they download). Following processing from item 110 to item 114, if the requested document should be password protected, in item 116 the computerized document management system adds the first unique password to the requested document to generate a first password-protected document, and adds the second unique password to the requested document to generate a second password-protected document.

Thus, with embodiments herein, a document is automatically locked and/or encrypted, and the password protection is triggered by the act of downloading the document from a repository). By providing each copy of a document with a different password, the likelihood of the password for that document becoming widely known is lowered, because user's are less likely to give out their personal passwords (potentially for their account or for all documents in their account) than they are to share a password for a single document.

When adding the first unique password and the second unique password to the requested document in item 116, the method can create a password requirement within the native software utilized to open and edit the requested document, or the method can create a password requirement within external software utilized to maintain a folder for the requested document (and store the requested document within the password-protected folder). Therefore, if the native software used to open the document (such as Microsoft Word available from Microsoft Corporation, Redmond Oreg., USA for word processing or Lotus 1-2-3 available from Lotus Corporation, Westford Mass., USA for spreadsheet processing) has the ability to add password protection, the embodiments herein add the protection using the password features of such native programs. On the other hand, the embodiments can make up compressed or non-compressed folders (such as Zip folders available from Microsoft Corporation) that can be password protected and used to maintain the requested document.

Further, when the requested document is to be password protected, processing proceeds from item 116 to item 112, where the computerized document management system sends the first password-protected document to the first user, and sends the second password-protected document to the second user. Therefore, the exact same document is sent to the different users, except that each document has a different password. Further, when sending the documents in item 112, the documents do not need to be sent simultaneously and can be sent at different times, because different users may request the same document at different times.

Figure 2:
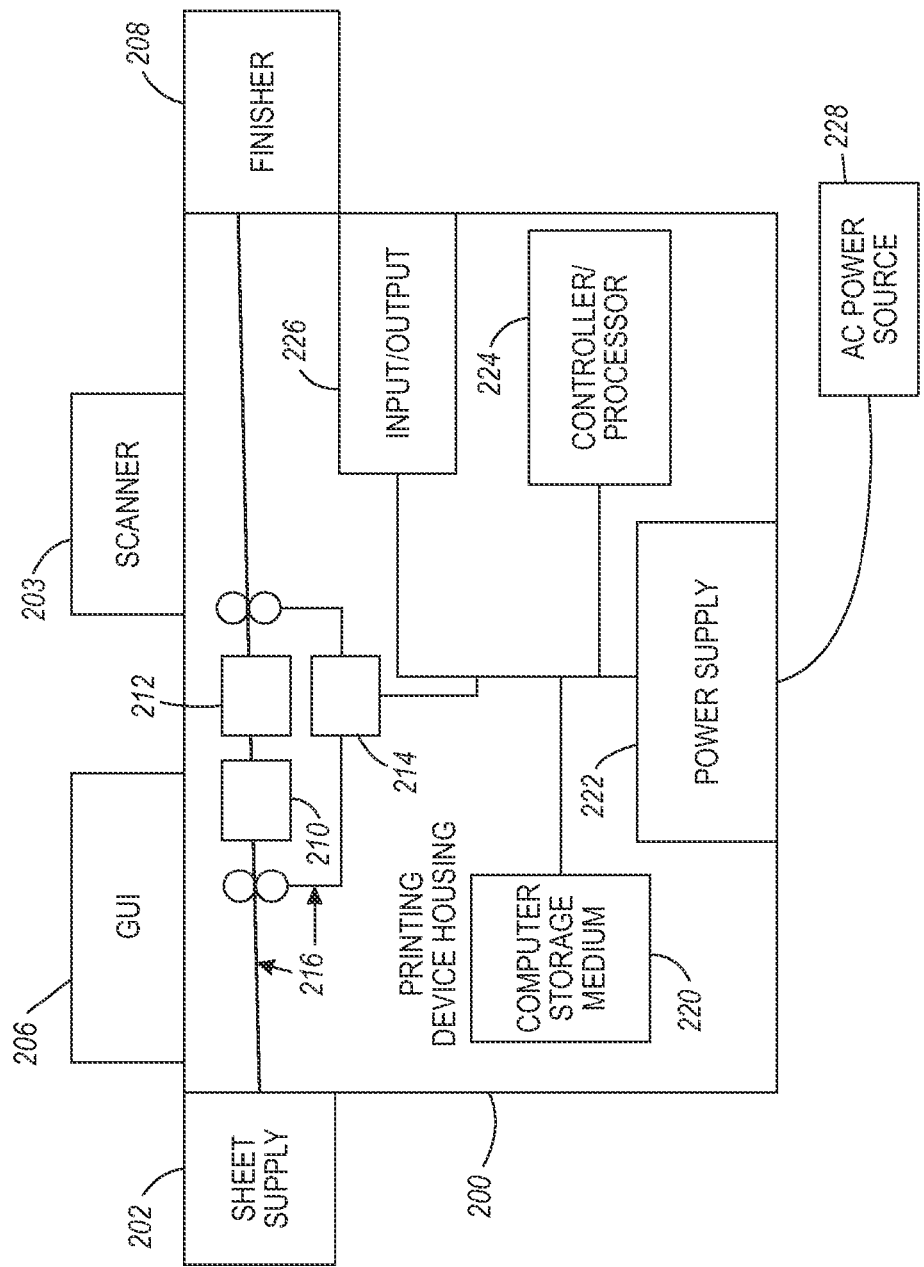
FIG. 2 is a side-view schematic diagram of a device according to embodiments herein.

A further embodiment illustrated in FIG. 2 comprises a printing device 200, which can comprise, for example, a printer, copier, multi-function machine, etc. The printing device 200 includes a controller/processor 224, at least one marking device (printing engine) 210, 212, 214 operatively connected to the processor 224, a media path 216 positioned to supply sheets of media from a sheet supply 202 to the marking device(s) 210, 212, 214, and a communications port (input/output) 226 operatively connected to the processor 224 and to a computerized network external to the printing device. After receiving various markings from the printing engine(s), the sheets of media pass to a finisher 208 which can fold, staple, sort, etc., the various printed sheets.

Further, the printing device 200 includes at least one accessory functional component (such as a scanner/document handler 204, sheet supply 202, finisher 208, etc.) and graphic user interface assembly 206 that also operate on the power supplied from the external power source 228 (through the power supply 222).

An input/output device 226 is used for communications to and from the multi-function printing device 200. The processor 224 controls the various actions of the printing device. A non-transitory computer storage medium 220 (which can be optical, magnetic, capacitor based, etc.) is readable by the processor 224 and stores instructions that the processor 224 executes to allow the multi-function printing device to perform its various functions, such as those described herein.

Thus, a printer body housing 200 has one or more functional components that operate on power supplied from the alternating current (AC) 228 by the power supply 222. The power supply 222 connects to an external alternating current power source 228 and converts the external power into the type of power needed by the various components.

Any user, such as the users discussed above, can provide their password to the graphic user interface 206 and the printing device 200 can communicate with an external network (such as the network 400 shown in FIG. 4) to log into their individual account with a hosted document service. The user can request that a document be downloaded to the printing device 200 for printing or viewing. As shown in FIG. 1, if the document needs a password, it will be given a password unique to the user. The password-protected document can then be stored on the computer storage medium 220 and printed (or viewed on the graphic user interface 206) when it is convenient for the user. The printing device 200 may only allow access to the downloaded document (printing or viewing, if such are allowed by the document rights of the document) if the user is properly logged into their account through the printing device 200 and has supplied the proper password for the document.

As would be understood by those ordinarily skilled in the art, the printing device 200 shown in FIG. 2 is only one example and the embodiments herein are equally applicable to other types of printing devices that may include less components or more components. For example, while a limited number of printing engines and paper paths are illustrated in FIG. 2, those ordinarily skilled in the art understand that many more paper paths and additional printing engines could be included within any printing device used with embodiments herein.

Figure 3:
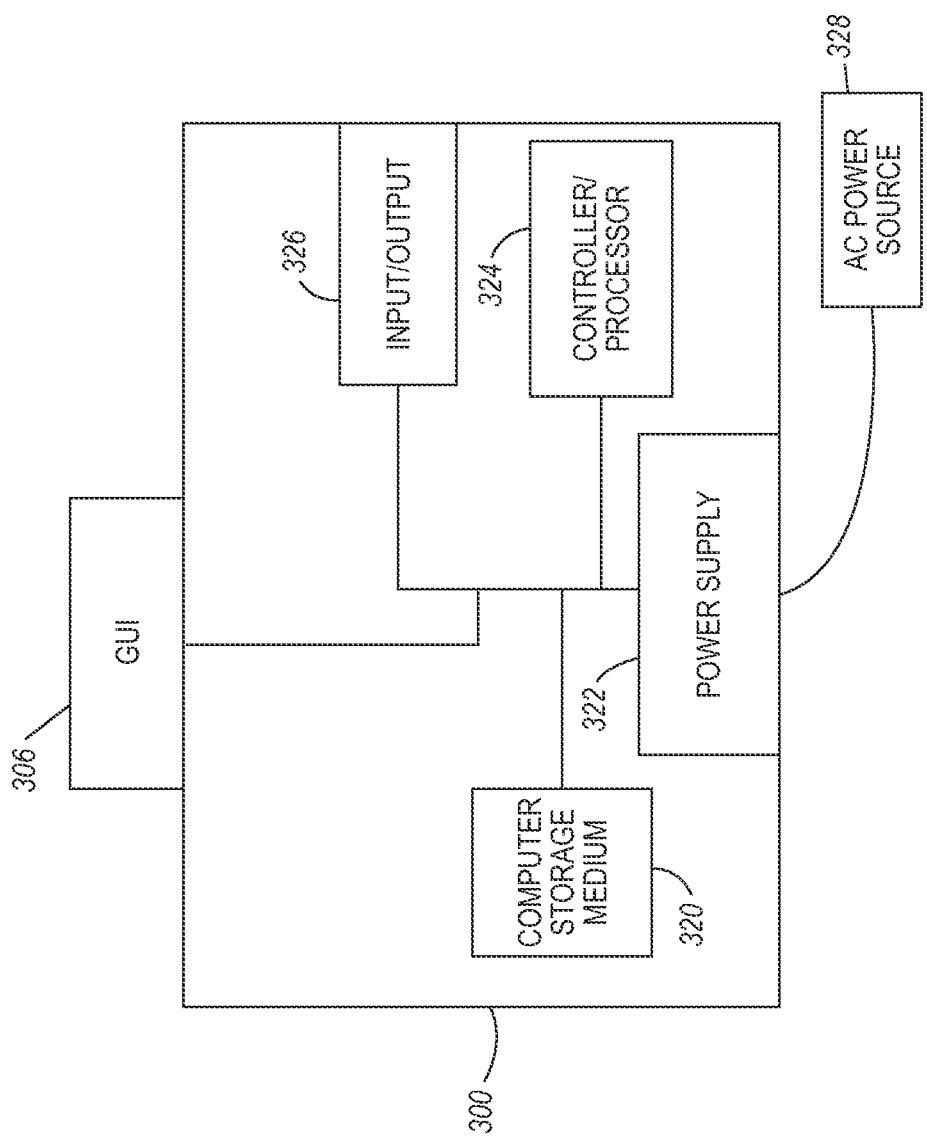
FIG. 3 is a side-view schematic diagram of a device according to embodiments herein.
Figure 4:
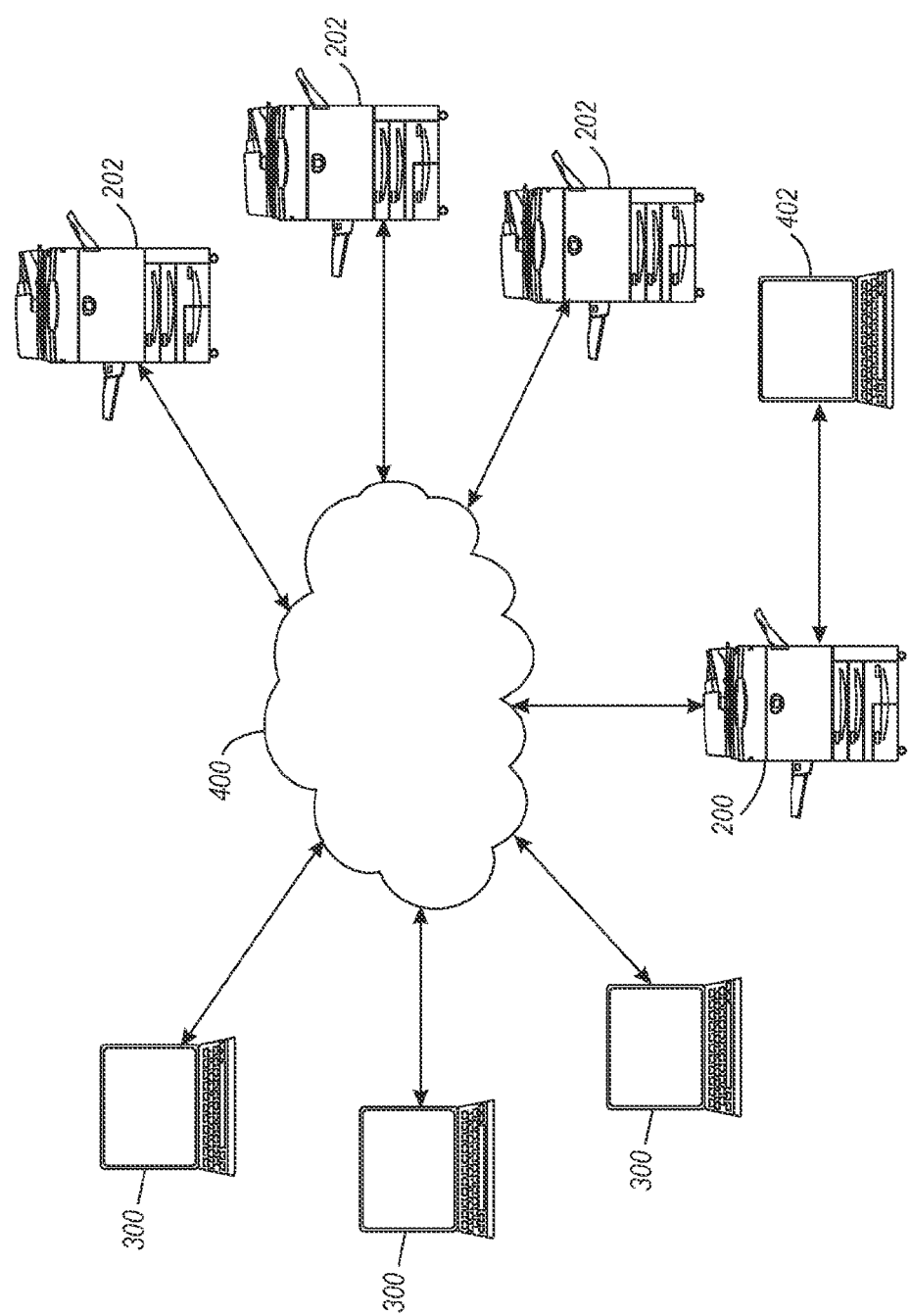
FIG. 4 is a schematic diagram of a system according to embodiments herein.

As shown in FIGS. 3 and 4, further embodiments herein comprise at least one computerized device 300 for hosting a document access service that includes a controller/processor 324, and a communications port (input/output) 326 operatively connected to the processor 324 and to a computerized network 400 external to the computerized device 300. The computerized device 300 is operatively connected to a printing device (such as printing device 200 discussed above) and to a plurality of different printing devices 202 through the computerized network. The other printing devices 202 have details similar to those shown in FIG. 2, but may use different raster image processors, different hardware and software protocols, etc.

In operation, the computerized device 300 (acting on instructions stored in the computer storage medium 320) grants, to the user, access to a user's account maintained by the computerized document management system 300 based on the user login through the graphic user interface of the printing device 200 or through a graphic user interface of user's computerized device 402. The computerized document management system is accessible to a plurality of users through the different devices 200, 202 402.

One of the computerized devices 300 receives a request from a user to provide a requested document and the computerized device 300 determines whether the requested document should be password protected. If the requested document should be password protected, the computerized device 300 generates a unique password for the requested document. As shown above, the unique password is unique to the user and is based upon information contained within the user account by the computerized document management system 300. Again, if the requested document should be password protected, the computerized device 300 adds the unique password to the requested document to generate a password-protected document and sends the password-protected document to the first user through one of the devices 200, 202, 402.

The embodiments herein are platform independent and therefore, regardless of the device manufacturer, the hosted application to add unique passwords described herein is a powerful tool when using all types of printing devices.

Further, the embodiments herein allow users to perform actions at remote locations. For example, the user could be at a location where they have do not have access to a workstation (and cannot connect their personal devices to a local network for security or other reasons). Because the embodiments herein can be invoked from the printing device user interface, the user can still benefit from the embodiments herein without needing to utilize a workstation.

Additionally, the embodiments herein do not require software to be installed locally because the embodiments herein can be hosted in the web or cloud architecture and are accessible via the printing device user interface.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
receiving a user login from a first device operated by a user into a computerized document management system accessible to a plurality of users, said computerized document management system comprising at least one computerized device;
granting, by said computerized document management system, to said first device, access to a user account of said user maintained by said computerized document management system based on said user login;
receiving, by said computerized document management system, a request from said first device operated by said user to provide a requested document;
determining, by said computerized document management system, whether said requested document should be password protected;
if said requested document should be password protected, generating, by said computerized document management system, a unique password for said requested document, said unique password being unique to said user and being based upon information contained within said user account;
if said requested document should be password protected, adding, by said computerized document management system, said unique password to said requested document to generate a password-protected document, said adding said unique password comprising one of:
adding said unique password using native software utilized to open and edit said requested document; and
adding said unique password using an external software utilized to maintain a folder for said requested document, and storing said requested document within said folder; and
sending, by said computerized document management system, said password-protected document to said first device,
said unique password being required to open one of said password-protected document within said native software and said folder within said external software, and
said adding of said unique password to said requested document being performed automatically by said computerized document management system triggered only by said receiving of said request to provide said requested document.

2. The method according to claim 1, further comprising, if said requested document should not be password protected, sending, by said computerized document management system, said requested document to said first device.

3. The method according to claim 1, further comprising determining, by said computerized document management system, whether said user login is a valid user login.

4. The method according to claim 1, further comprising receiving, by said computerized document management system, document rights relating to said requested document from a third party, said third party being different than said user, and said determining of whether said requested document should be password protected being based upon said document rights of said requested document.

5. A method comprising:
receiving a first user login from a first user and a second user login from a second user into a computerized document management system accessible to a plurality of users, said computerized document management system comprising at least one computerized device;
granting, by said computerized document management system, to said first user, access to a first user account of said first user maintained by said computerized document management system based on said first user login;
granting, by said computerized document management system, to said second user, access to a second user account of said second user maintained by said computerized document management system based on said second user login;
receiving, by said computerized document management system, a request from said first user and said second user to provide a requested document;
determining, by said computerized document management system, whether said requested document should be password protected;
if said requested document should be password protected, generating, by said computerized document management system, a first unique password and a second unique password for said requested document, said first unique password being unique to said first user and being based upon information contained within said first user account, said second unique password being different than said first unique password and being unique to said second user and being based upon information contained within said second user account;
if said requested document should be password protected, adding, by said computerized document management system, said first unique password to said requested document to generate a first password-protected document, and adding said second unique password to said requested document to generate a second password-protected document, said adding said first unique password comprising one of:
adding said first unique password using native software utilized to open and edit said requested document; and
adding said first unique password using an external software utilized to maintain a folder for said requested document, and storing said requested document within said folder, and said adding said second unique password comprising one of:
adding said second unique password using native software utilized to open and edit said requested document; and
adding said second unique password using an external software utilized to maintain a folder for said requested document, and storing said requested document within said folder; and
sending, by said computerized document management system, said first password-protected document to said first user, and sending said second password-protected document to said second user, said first unique password being required to open one of said first password-protected document within said native software and said folder within said external software, said second unique password being required to open one of said second password-protected document within said native software and said folder within said external software, and said adding of said first unique password and said second unique password to said requested document being performed automatically by said computerized document management system triggered only by said receiving of said request to provide said requested document.

6. The method according to claim 5, further comprising, if said requested document should not be password protected, sending, by said computerized document management system, said requested document to said first user and said second user.

7. The method according to claim 5, further comprising determining, by said computerized document management system, whether said first user login is a valid first user login; and determining, by said computerized document management system, whether said second user login is a valid second user login.

8. The method according to claim 5, further comprising receiving, by said computerized document management system, document rights relating to said requested document from a third party, said third party being different than said first user and said second user, and said determining of whether said requested document should be password protected being based upon said document rights of said requested document.

9. A method comprising:

receiving a user login from a graphic user interface of a printing device operated by a user into a computerized document management system accessible to a plurality of users, said computerized document management system comprising at least one computerized device;

granting, by said computerized document management system, to said printing device, access to a user account of said user maintained by said computerized document management system based on said user login;

receiving, by said computerized document management system, a request from said graphic user interface of said printing device operated by said user to provide a requested document;

determining, by said computerized document management system, whether said requested document should be password protected;

if said requested document should be password protected, generating, by said computerized document management system, a unique password for said requested document, said unique password being unique to said user and being based upon information contained within said user;

if said requested document should be password protected, adding, by said computerized document management system, said unique password to said requested document to generate a password-protected document, said adding said unique password comprising one of:

adding said unique password using native software utilized to open and edit said requested document; and adding said unique password using an external software utilized to maintain a folder for said requested document, and storing said requested document within said folder; and sending, by said computerized document management system, said password-protected document to said printing device to allow said printing device to print said password-protected document, said unique password being required to open one of said password-protected document within said native software and said folder within said external software, said adding of said unique password to said requested document being performed automatically by said computerized document management system triggered only by said receiving of said request to provide said requested document.

10. The method according to claim 9, further comprising, if said requested document should not be password protected, sending, by said computerized document management system, said requested document to said printing device.

11. The method according to claim 9, further comprising determining, by said computerized document management system, whether said user login is a valid user login.

12. The method according to claim 9, further comprising receiving, by said computerized document management system, document rights relating to said requested document from a third party, said third party being different than said user, and said determining of whether said requested document should be password protected being based upon said document rights of said requested document.

13. A non-transitory computer storage medium, readable by computerized device, said non-transitory computer storage medium storing instructions to cause said computerized device to perform a method comprising:

receiving a user login from a user;

granting, to said user, access to a user account of said user maintained by a computerized document management system based on said user login, said computerized document management system being accessible to a plurality of users;

receiving a request from said user to provide a requested document;

determining whether said requested document should be password protected;

if said requested document should be password protected, generating a unique password for said requested document, said unique password being unique to said user and being based upon information contained within said user account;

if said requested document should be password protected, adding said unique password to said requested document to generate a password-protected document, said adding said unique password comprising one of:

adding said unique password using native software utilized to open and edit said requested document; and adding said unique password using an external software utilized to maintain a folder for said requested document, and storing said requested document within said folder; and sending said password-protected document to said user, said unique password being required to open one of said password-protected document within said native software and said folder within said external software, said adding of said unique password to said requested document being performed automatically by said computerized document management system triggered only by said receiving of said request to provide said requested document.

14. The non-transitory computer storage medium according to claim 13, said non-transitory computer storage medium storing instructions to cause said computerized device to perform said method comprising, if said requested document should not be password protected, sending said requested document to said user.

15. The non-transitory computer storage medium according to claim 13, said non-transitory computer storage medium storing instructions to cause said computerized device to perform said method comprising determining, by said computerized document management system, whether said user login is a valid user login.

16. The non-transitory computer storage medium according to claim 13, said non-transitory computer storage medium storing instructions to cause said computerized device to perform said method comprising receiving, by said computerized document management system, document rights relating to said requested document from a third party, said third party being different than said user, and said determining of whether said requested document should be password protected being based upon said document rights of said requested document.

* * * * *